United States Patent
Procopio et al.

(10) Patent No.: US 9,177,255 B1
(45) Date of Patent: Nov. 3, 2015

(54) CLOUD SYSTEMS AND METHODS FOR DETERMINING THE PROBABILITY THAT A SECOND APPLICATION IS INSTALLED BASED ON INSTALLATION CHARACTERISTICS

(71) Applicant: Google Inc., Mountain View, CA (US)

(72) Inventors: Michael Jeffrey Procopio, Boulder, CO (US); Eric Benson Schoeffler, Boulder, CO (US)

(73) Assignee: Google Inc., Mountain View, CA (US)

( * ) Notice: Subject to any disclaimer, the term of this patent is extended or adjusted under 35 U.S.C. 154(b) by 217 days.

(21) Appl. No.: 14/040,772

(22) Filed: Sep. 30, 2013

(51) Int. Cl.
G06F 15/18 (2006.01)
G06N 5/04 (2006.01)
G06F 21/51 (2013.01)

(52) U.S. Cl.
CPC ............... G06N 5/048 (2013.01); G06F 21/51 (2013.01)

(58) Field of Classification Search
CPC ...... G06F 21/51; G06F 2201/865; G06F 8/60
See application file for complete search history.

(56) References Cited

U.S. PATENT DOCUMENTS

| 7,617,519 | B2 | 11/2009 | Williams |
| 8,452,797 | B1 | 5/2013 | Paleja et al. |
| 8,468,164 | B1 | 6/2013 | Paleja et al. |
| 8,612,470 | B1 | 12/2013 | Fushman et al. |
| 2006/0136389 | A1 | 6/2006 | Cover et al. |
| 2007/0060099 | A1 | 3/2007 | Ramer et al. |
| 2009/0006398 | A1 | 1/2009 | Lam et al. |
| 2009/0106314 | A1 | 4/2009 | Song et al. |
| 2009/0259998 | A1 | 10/2009 | Bergman et al. |
| 2010/0042608 | A1 | 2/2010 | Kane |
| 2010/0094878 | A1 | 4/2010 | Soroca et al. |
| 2010/0250337 | A1 | 9/2010 | Kassaei |
| 2011/0153853 | A1 | 6/2011 | London et al. |
| 2011/0307354 | A1 | 12/2011 | Erman et al. |
| 2012/0072283 | A1 | 3/2012 | DeVore et al. |
| 2012/0084292 | A1 | 4/2012 | Liang et al. |
| 2012/0096435 | A1 | 4/2012 | Manolescu et al. |
| 2012/0179973 | A1 | 7/2012 | Brolley et al. |

(Continued)

FOREIGN PATENT DOCUMENTS

| KR | 2003-0016494 | 3/2003 |
| WO | WO 2013/062546 | 5/2013 |

OTHER PUBLICATIONS

International Search Report and Written Opinion for Application No. PCT/US2014/053012 dated Nov. 27, 2014, 10 pages.

(Continued)

*Primary Examiner* — David Vincent
(74) *Attorney, Agent, or Firm* — Ropes & Gray LLP

(57) ABSTRACT

A method for providing a conditional scored list of applications for use in recommending applications includes storing on a cloud computing service a conditional probability table across a set of available applications provided by the cloud computing service. The cloud computing service receives a request to provide a scored list of applications for a user, retrieves a set of user-installed applications for the user, and calculates a total conditional probability for each application in the set of available applications. The cloud computing service then constructs the scored list of applications from the set of available applications, where a score of each application is its corresponding total conditional probability, and outputs the scored list of applications.

26 Claims, 7 Drawing Sheets

(56) References Cited

U.S. PATENT DOCUMENTS

| | | |
|---|---|---|
| 2012/0215684 A1 | 8/2012 | Kidron |
| 2012/0303477 A1 | 11/2012 | Ben-Itzhak |
| 2013/0103758 A1 | 4/2013 | Alison et al. |
| 2013/0132896 A1 | 5/2013 | Lee et al. |
| 2013/0138674 A1 | 5/2013 | Jeong et al. |
| 2013/0166357 A1 | 6/2013 | Eggs et al. |
| 2013/0173637 A1 | 7/2013 | Kim et al. |
| 2013/0185292 A1 | 7/2013 | Li et al. |
| 2013/0198029 A1 | 8/2013 | Mowatt et al. |
| 2013/0198506 A1 | 8/2013 | Smith et al. |
| 2013/0311836 A1* | 11/2013 | Hurst et al. .................... 714/48 |
| 2014/0222952 A1* | 8/2014 | Suryavanshi et al. ......... 709/217 |

OTHER PUBLICATIONS

International Search Report and Written Opinion for Application No. PCT/US2014/053565 dated Dec. 2, 2014, 8 pages.

Han, et al., "Efficient Service Recommendation System for Cloud Computing Market", ICIS 2009, Nov. 24-26, (2009) pp. 839-845.

* cited by examiner

300

|        | App A | App B | App C | App D | App E |
|--------|-------|-------|-------|-------|-------|
| User 1 | 0     | 0     | 1     | 1     | 1     |
| User 2 | 1     | 0     | 0     | 0     | 0     |
| User 3 | 1     | 1     | 0     | 1     | 1     |
| User 4 | 1     | 1     | 0     | 0     | 1     |

|                    | App A | App B | App C | App D | App E |
|--------------------|-------|-------|-------|-------|-------|
| Global Probability | 0.75  | 0.5   | 0.25  | 0.5   | 0.75  |

| | App A | App B | App C | App D | App E |
|---|---|---|---|---|---|
| App A | 1 | 1 | 0 | 0.5 | 0.67 |
| App B | 0.67 | 1 | 0 | 0.5 | 0.67 |
| App C | 0 | 0 | 1 | 1 | 0.67 |
| App D | 0.33 | 0.5 | 1 | 1 | 0.67 |
| App E | 0.67 | 1 | 1 | 1 | 1 |

FIG. 5

CLOUD SYSTEMS AND METHODS FOR DETERMINING THE PROBABILITY THAT A SECOND APPLICATION IS INSTALLED BASED ON INSTALLATION CHARACTERISTICS

BACKGROUND

Cloud computing services provide users with the ability to store, access, edit, and share electronic files using any electronic device capable of connecting to the cloud computing service over a remote network, such as the Internet. The files are stored on the cloud computing service rather than the user's electronic devices. The cloud computing service provides a user interface, for example through a web browser, for users to access and view the files. The files stored on cloud computing services may include word processing documents, spreadsheet files, presentation files, picture files, audio files, video files, and a number of other open or proprietary file formats.

A cloud computing service may be able to open many of the files that it stores through its user interface. However, cloud computing services may not be configured to open, display, or edit certain types of files, especially for some proprietary or less common file types. Cloud computing services may instead offer third-party applications to the user, where the third-party applications may be used to open certain files stored on the cloud computing service, as well as perform other functions. Third-party developers work with the cloud computing service to make the applications available to the user. Users may select and install an application to use in conjunction with or separately from the cloud computing service. Cloud computing services may offer a large number of applications to users. Users may be overwhelmed with choices and may not be aware of certain applications that they may find useful. In addition, users may find it difficult to select between several similar applications, and also may not have the time to install many applications and test each one to find applications that they like.

SUMMARY

The systems and methods described herein provide ways to recommend applications offered by a cloud computing service to a user, where the recommendation is based on the installation characteristics of the applications across all users of the cloud computing service. The cloud computing service stores the installation status of all available applications across the users of the cloud computing service. The cloud computing service builds a global probability table that stores a global installation probability for each application across all the users of the cloud computing service. The cloud computing service also builds a conditional probability table across all the available applications, with the conditional probability of one application given a second application is the probability that the first application will be installed by a user given that the second application is already installed. For a user with a set of applications already installed, the cloud computing service may use the conditional probability table and the set of user-installed applications to create a scored list of applications. The scored list of applications is based on which applications are most frequently installed given the user's set of installed applications. The scored list of applications may be further processed to determine one or more applications to recommend to the user. Alternatively, the cloud computing service may use the global probability table to determine a scored list of applications for recommendation to the user.

One aspect described herein discloses a method for providing a conditional scored list of applications for use in recommending applications to a user. The method includes storing on a cloud computing service a conditional probability table across a set of available applications provided by the cloud computing service, where a first conditional probability in the conditional probability table is the probability that users of the cloud computing service who have installed a first application in the set of available applications have also installed a second application in the set of available applications. The method further includes receiving at the cloud computing service a request to provide a scored list of applications for a user, retrieving a set of user-installed applications for the user, and calculating a total conditional probability for each application in the set of available applications, where the total conditional probability of an application in the set of available applications is a function of the conditional probabilities of the application obtained from the conditional probability table given each application in the set of user-installed applications. The method further includes constructing the scored list of applications from the set of available applications, where a score of each application is its corresponding total conditional probability, and outputting the scored list of applications.

Another aspect described herein discloses a method for providing a scored list of applications for use in recommending applications to a user. The method includes calculating a global probability for each application in a set of available applications provided by a cloud computing service, where the global probability of each application is the percentage of users of the cloud computing service that have currently installed the application. The method further includes receiving at the cloud computing service a request to provide a scored list of applications for a user, constructing the scored list of applications from the set of available applications, where a score of each application in the scored list of applications is its corresponding global probability, and outputting the scored list of applications.

Another aspect described herein discloses an apparatus for providing a scored list of applications for use in recommending applications to a user. The apparatus includes a server configured to communicate with a plurality of client computers and store a conditional probability table across a set of available applications provided by the server, where a first conditional probability in the conditional probability table is the probability that users of the server who have installed a first application in the set of available applications have also installed a second application in the set of available applications. The server is further configured to receive a request to provide a conditional scored list of applications for a user, retrieve a set of user-installed applications for the user, and calculate a total conditional probability for each application in the set of available applications, where the total conditional probability of an application in the set of available applications is a function of the conditional probabilities of the application obtained from the conditional probability table given each application in the set of user-installed applications. The server is further configured to construct the conditional scored list of applications from the set of available applications, where a score of each application is its corresponding total conditional probability, and output the conditional scored list of application.

Another aspect described herein discloses a system for providing a scored list of applications for use in recommending applications to a user. The system includes a plurality of client computers and a server configured to communicate with the plurality of client computers and store a conditional probability table across a set of available applications provided by the server, where a first conditional probability in the conditional probability table is the probability that users of the server who have installed a first application in the set of available applications have also installed a second application in the set of available applications. The server is further configured to receive a request to provide a conditional scored list of applications for a user, retrieve a set of user-installed applications for the user, and calculate a total conditional probability for each application in the set of available applications, where the total conditional probability of an application in the set of available applications is a function of the conditional probabilities of the application obtained from the conditional probability table given each application in the set of user-installed applications. The server is further configured to construct the conditional scored list of applications from the set of available applications, where a score of each application is its corresponding total conditional probability, and output the conditional scored list of application.

BRIEF DESCRIPTION OF THE DRAWINGS

The methods and systems may be better understood from the following illustrative description with reference to the following drawings in which:

FIG. 3 shows an example of a raw application installation table in accordance with an implementation as described herein;

FIG. 4 shows an example of a global probability table in accordance with an implementation as described herein;

FIG. 5 shows an example of a conditional probability table in accordance with an implementation as described herein;

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices.

Aspects of the systems and methods described herein relate to providing a way to recommend applications to a user, where the recommendation is based on the installation characteristics of the applications across all users of the cloud computing service. The cloud computing service stores the installation status of all available applications across the users of the cloud computing service. The cloud computing service builds a global probability table that stores a global installation probability for each application across all the users of the cloud computing service. The cloud computing service also builds a conditional probability table across all the available applications, with the conditional probability of one application given a second application is the probability that the first application will be installed by a user given that the second application is already installed. For a user with a set of applications already installed, the cloud computing service may use the conditional probability table and the set of user-installed applications to create a scored list of applications. The scored list of applications is based on which applications are most frequently installed given the user's set of installed applications. The scored list of applications may be further processed to determine one or more applications to recommend to the user. Alternatively, the cloud computing service may use the global probability table to determine a scored list of applications for recommendation to the user.

Figure 1:
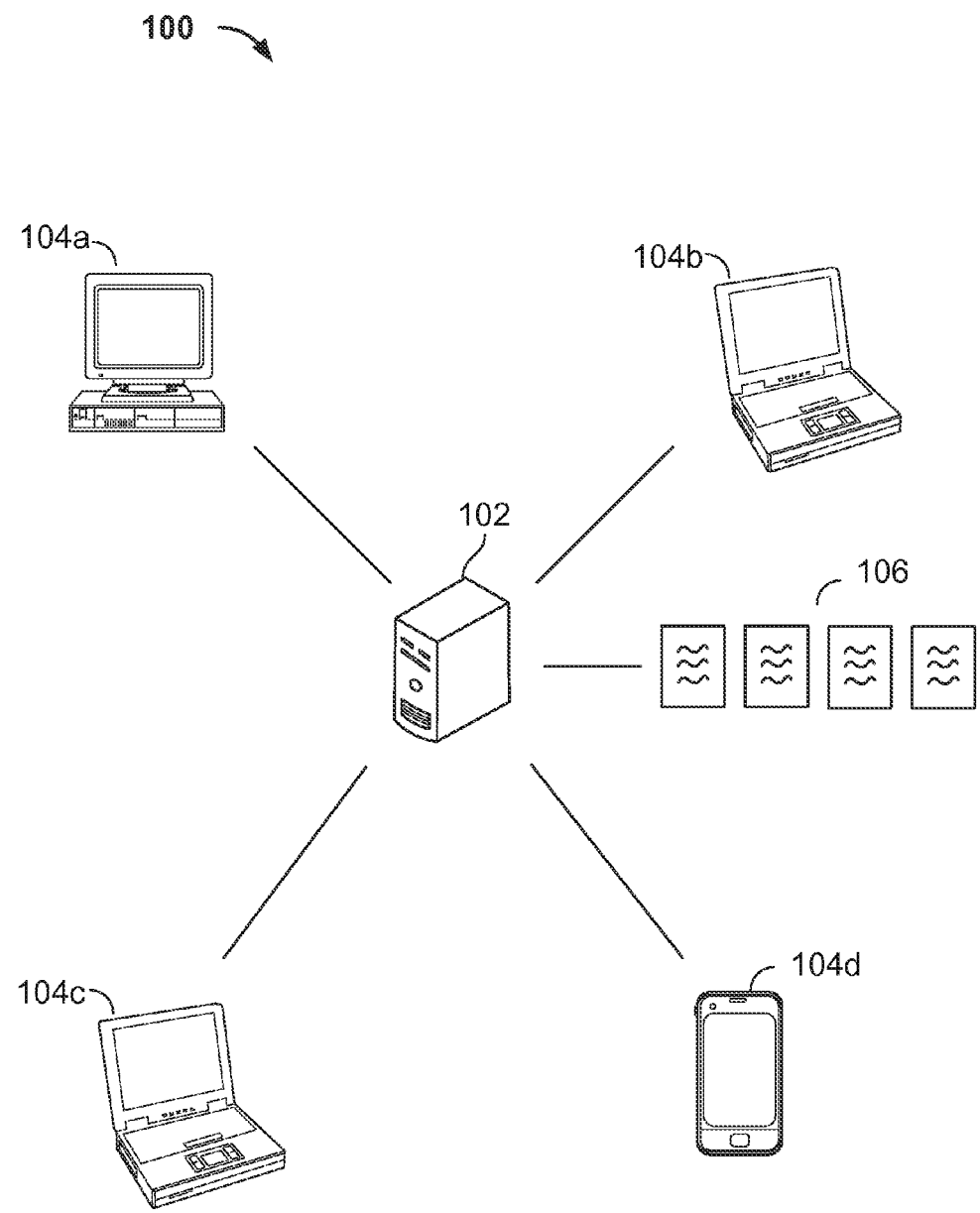
FIG. 1 shows a number of client computers in communication with a cloud computing service in accordance with an implementation as described herein.

First, a network system in which a number of client computers may connect to a cloud computing service is described. FIG. 1 shows a network system 100 that includes cloud computing service 102 and a number of client computers 104a through 104d. Cloud computing service 102 may include one or more servers that collectively provide cloud computing services for a number of client computers. Cloud computing service 102 stores a number of files accessible by client computers 104a-104d, such as files 106. Files 106 may include word processing documents, spreadsheets, presentations, images, audio files, video files, or any other files of various open or proprietary file types. Users may create, edit, copy, share, and delete files stored on cloud computing service 102. Client computers 104a-104d may include desktop computers, laptop computers, tablets, smart phones, mobile electronic devices, or any other device that may connect to cloud computing service 102 to view files 106. System 100 may include many additional client computers not pictured in FIG. 1. The network connection between the client computers 104a-104d and cloud computing service 102 in network system 100 may be facilitated through a local area network, wide area network, Ethernet, fiber optic network, or any other wired or wireless connection.

Figure 2:
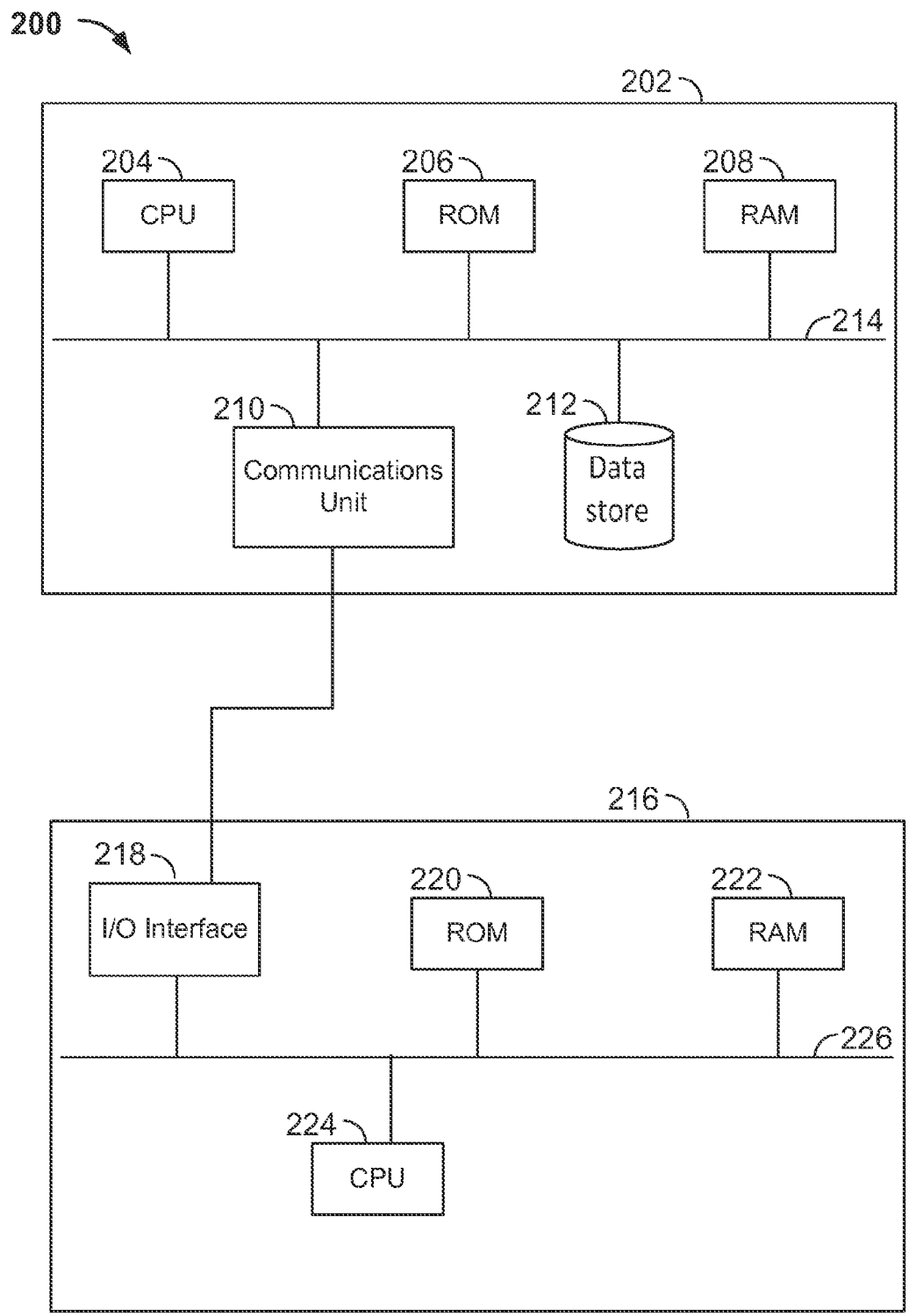
FIG. 2 shows the components of a cloud computing service in communication with a client computer in accordance with an implementation as described herein.

The components of a client computer and a cloud computing service in communication with each other are now described in more detail. System 200 in FIG. 2 includes a cloud computing service 202 in communication with a client computer 216. Cloud computing service 202 includes a central processing unit (CPU) 204, read-only memory (ROM) 206, random access memory (RAM) 208, communications unit 210, data store 212, and bus 214. Cloud computing service 202 may have additional components that are not illustrated in FIG. 2. Bus 214 allows the various components of cloud computing service 202 to communicate with each other. Communications unit 210 allows cloud computing service 202 to communicate with other devices, such as client computer 216 and other client computers. Data store 212 is used to store files accessible by a user on client computer 216. Users log on to the cloud computing service using a username and password, and cloud computing service 202 provides a user interface for the display of files through the web browsers executing on the client computers. Data store 212 may also store a number of applications that are made available to users for installation.

Data store 212 may also store metadata regarding files and users, and may store tables, matrices, files and other data structures based on the file and user metadata. The data structures may be used by cloud computing service 202 to create scored list of applications for use in making application recommendations to users. These data structures may include a raw application installation table, a global probability table, and a conditional probability table, each of which are discussed further herein. The data structures may be updated or recalculated on a periodic basis by a data process scheduler executed by CPU 204. File and user metadata may be changed by recent user actions, so data structures based on the metadata are recalculated to account for those recent actions. CPU 204 may load some data structures to RAM 208, e.g. a data cache, while CPU 204 processes requests to provide a scored list of applications. The data cache allows CPU 204 to reference recently used data and is periodically refreshed.

Client computer 216 includes a CPU 224, ROM 220, RAM 222, input/output interface 218, and bus 226. Client computer 216 may have additional components that are not illustrated in FIG. 2. Bus 226 allows the various components of client computer 216 to communicate with each other. Input/output interface 218 allows client computer 216 to communicate with other devices, such as cloud computing service 202. Input/output interface 218 also includes devices for taking in user inputs and displaying outputs to a user, such as a keyboard, mouse, and display screen. CPU 224 executes various programs stored in memory on client computer 216, such as a web browser. Web browsers are used, among other things, to display a user interface provided by cloud computing service 202 for viewing and editing files. Web browsers receive web page documents encoded in HTML, CSS, or other web-compatible languages and interpret the language to properly display the web page.

Data store 212 for storing files, applications, and data structures on cloud computing service 202, a web browser executing on client computer 216, and other data structures and software programs in system 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and read-only, once-writable, or rewriteable optical disks (such as, e.g., CDROM, CDR, CD+R, CDRW, CD+RW, DVDROM, DVDR, DVD+R, DVDRW, and DVD+RW).

A cloud computing service has a large base of users and available applications, and is capable of collecting aggregate data concerning the installation and usage of applications by users. The data are statistically significant and may be harnessed to generate application recommendations to a particular user. One type of information that a cloud computing service may store is the current installation status of every available application by every user. A cloud computing service may construct and update a table capturing this information. FIG. 3 shows an example of a raw application installation table 300 for storing the installation status of applications by users. The rows of table 300 represent each user of the cloud computing service and the columns of table 300 represent each application provided to users by the cloud computing service, although table 300 may also be constructed with users in the columns and applications in the rows. There may be a large number of rows and columns as the cloud computing service has many users and many applications. Each cell has either a "1" or "0" entry, with "1" representing that the particular user has currently installed the particular application. The "0" represents that the user has not installed the particular application or has un-installed the application. For example, User 2 in table 300 has currently installed App A but no other applications. The entries and table 300 are not limited to "1" and "0" but may include any representation of the installation status of an application, such as "Yes" and "No" or "Installed" and "Not Installed," for instance.

The cloud computing service stores and maintains table 300. For example, the cloud computing service may receive a message each time a user installs or uninstalls an application, and the cloud computing service may update table 300 based on the message. Alternatively, the cloud computing service may update or recalculate table 300 on a periodic basis to capture recent user activity. Each application provided by the cloud computing service has a unique ID number that may serve as column identifiers. Each user also has an unique ID, which may serve as row identifiers.

Raw application installation table 300 may be used to generate a global probability table, which describes the percentage of all users of the cloud computing service who have installed each application. This percentage may also be considered a probability that a user will install an application. Overall, the global probability is a measure of the popularity of the application across all users. FIG. 4 shows a global probability table 400 that is derived from raw application installation table 300. Each column of table 400 represents an application, and application IDs may be used to represent each application in the table. Table 400 has a single row, which stores the global probability of each application. For example, table 300 shows that App A has been installed by User 2, User 3, and User 4 but not User 1. The global probability of App 1 may be calculated by averaging the values of the App A column in table 300. Thus in table 400 the global probability of App A, denoted as p(A), is 0.75, or 75%. The global installation probabilities of all applications provided by the cloud computing service are calculated and stored in table 400. The cloud computing service stores and maintains table 400, and may periodically recalculate the entries in table 400 to capture recent user activity. Thus table 400 describes the probability that each application is installed across the entire body of users.

Raw application installation table 300 may also be used to generate a conditional probability table that describes the probability that one application is installed by a user given that a second application is also installed by the user. This probability represents a correlation between applications. That is, an application may be more likely to be installed with certain other applications, and these related applications are considered co-incident or co-occurring. FIG. 5 shows a conditional probability table 500 that is derived from raw application installation table 300. The rows and columns of table 500 represent all the available applications provided by the cloud computing service, and application IDs may be used to represent each application in the table. Each entry in table 500 represents the probability that the application of the particular row is installed given that the application of the particular column is already installed. Entries in which the row and column applications are the same have a probability of 1, or 100%. For example, table 300 shows that App D was installed by User 1 and User 3. Of those two users, only User 3 also installed App A. Thus the conditional probability of App A given App D, denoted as p(A|D), is 0.5 or 50%. The conditional probabilities of each application given a particular application may be calculated from table 300 by selecting the rows in table 300 in which the given application has been installed (i.e. the rows where the given application has a value of "1"). Once the "0" or un-installed rows have been filtered out, the conditional probability of each application is calculated by averaging the values of each column. This calculation is repeated with each available application designated as the given application to construct table 500. The cloud computing service stores and maintains table 500, and may periodically recalculate the entries in table 500 to capture recent user activity.

Figure 6:
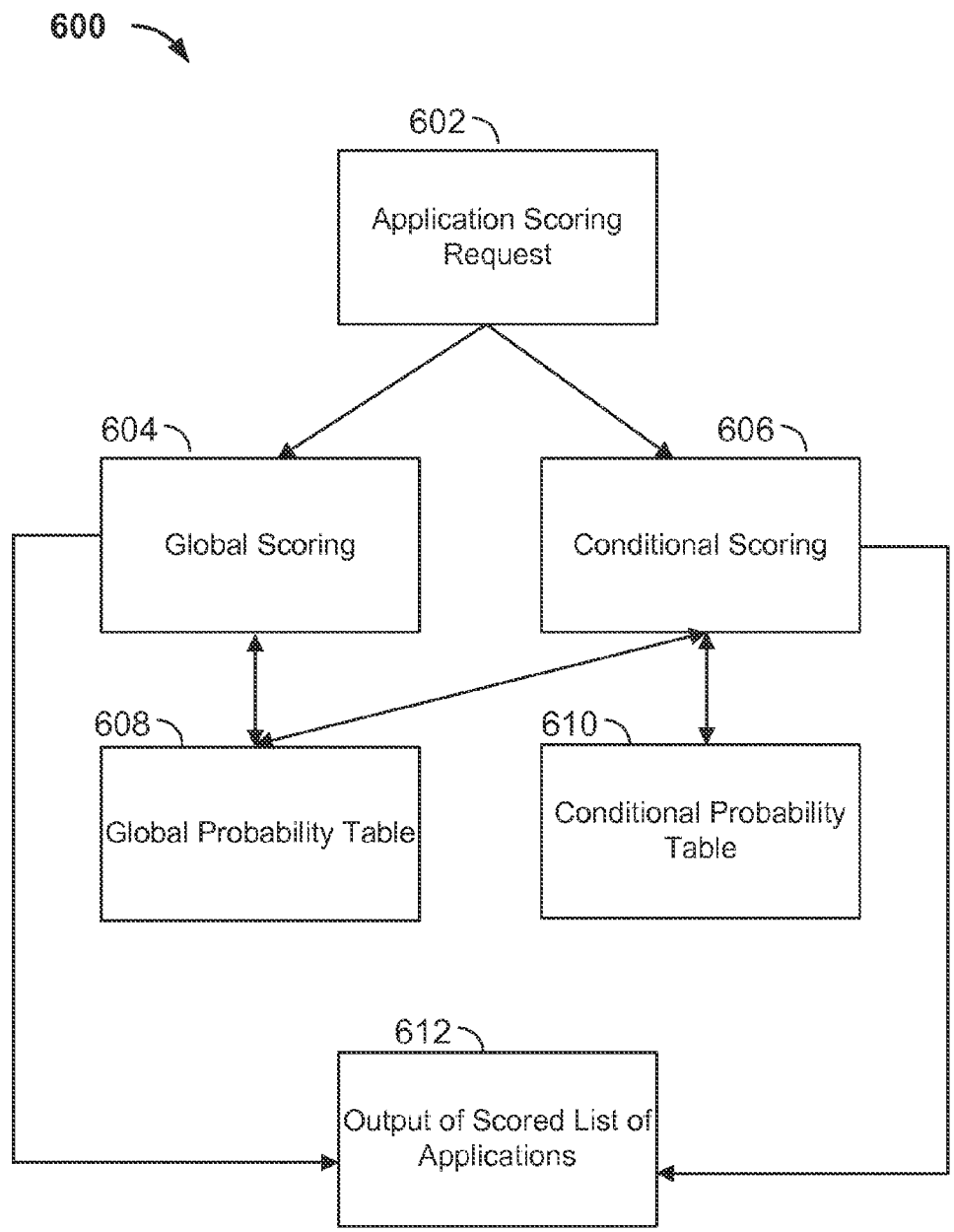
FIG. 6 shows a scorer unit for generating a scored list of applications in accordance with an implementation as described herein.

The global probability table in FIG. 4 and the conditional probability table in FIG. 5 may be used to recommend applications to a user. The global probability table may be used to recommend applications that are the most popular, or most frequently installed, by the entire user base of the cloud computing service. The conditional probability table may be used to recommend applications to a user given the set of applications that the user has already installed. That is, given the applications the user already has, additional applications that are most frequently installed with the given user applications are recommended to the user. The cloud computing service may have a scorer unit that utilizes the global probability table and conditional probability table to create a scored list of applications, where the score is a function of the global or conditional probabilities and the list may be sorted by the score. This list may be used by the cloud computing service to recommend one or more applications to a user. FIG. 6 shows an example flow chart 600 of a scorer unit operated by the cloud computing service. The process flow for the scorer unit illustrated in FIG. 6 may be summarized below:

1. Receive request to score applications based on installation characteristics.
2. Determine whether global scoring or conditional scoring is used.
   a. If conditional scoring, determine whether unweighted or weighted scoring is used.
      1. If unweighted scoring, calculate score for each available application based on the conditional probability table and the user's set of installed applications.
      2. If weighted scoring, calculate score for each available application based on the conditional probability table, global probability table, and the user's set of installed applications.
   b. If global scoring, calculate score for each available application based on the global probability table.
3. Output scored list of applications.

The scorer unit is part of the cloud computing service and executes the above process flow each time a request is received to score applications based on installation characteristics. The process flow above is an example and additional tasks may be done by the scorer unit. For example, the scorer unit may sort the scored list of applications before outputting it. The scorer unit is initiated when an application scoring request is received, shown at 602. The scoring request may be triggered by a user action on the cloud computing user interface. For example, the scoring request may be initiated when a user logs into the cloud computing service, or when the user navigates to an application selection or application browsing screen, or when the user enters a file preview screen. These actions provide opportunities for the cloud computing service to display recommended applications to a user.

The scorer unit may choose between two scoring methodologies to fulfill the application scoring request, global scoring 604 or conditional scoring 606. The scorer unit may have a default selection for which scoring methodology to use, or the scoring request may include an indication of which methodology to use. Global scoring 604 uses the global probability table 608 to construct a scored list of applications. Global probability table 608 is similar to table 400 described in FIG. 4. Each application provided by the cloud computing service is assigned a score. The score is a function of the global probability, and may simply be the global probability of the application as stored in global probability table 608. The list of applications may be sorted by the score of each application, from highest score to lowest score. The scored list of applications may be a table or other data structure that lists the application ID of each application and its corresponding score. For example, if table 400 in FIG. 4 was the global probability table stored by the cloud computing service, the output may be a list starting with the application IDs of App A and App E, both with a score of 0.75 representing their global installation probabilities, followed by the application IDs of App B and App B with scores of 0.5, and lastly the application ID of App C with a score of 0.25.

Alternatively, the scorer unit may use conditional scoring 606 to construct the scored list of applications. The conditional probability table 610 is similar to table 500 in FIG. 5. Conditional scoring 606 may solely use the conditional probability table 610 to construct an unweighted conditional scoring, or may in addition use the global probability table 608 to construct a weighted conditional scoring. The choice between weighted and unweighted may be set by the scorer unit or could be found as an instruction within the scoring request, i.e provided by the unit or entity making the request. Conditional scoring 610 calculates a score for each application that is a function of the user-installed applications. When calculating the unweighted conditional score for an application, the scorer unit calculates the mean, or average, of the conditional probabilities of the application given each user-installed application. For example, table 500 in FIG. 5 is the conditional probability table for the cloud computing service and the user has installed App B, App C, and App D. The scorer unit calculates the unweighted conditional score for App A given App B, App C, and App D. The formula for the unweighted conditional score may be expressed as $p(A|B, C, D) = (p(A|B) + p(A|C) + p(A|D))/N$ where N is the number of user-installed applications (3 in this case). The values for the individual conditional probabilities $p(A|B)$, $p(A|C)$, and $p(A|D)$ are obtained directly from the conditional probability table. In table 500 in FIG. 5, the values are 1, 0, and 0.5 respectively. This gives an unweighted conditional score for App A of 0.5. In general, the total conditional probability for an application given a set $(U_1, U_2, \ldots U_N)$ of user-installed applications U may be calculated as $p(A|U_1, U_2, \ldots U_N) = (p(A|U_1) + p(A|U_2) + \ldots + p(A|U_N))/N$. However, other ways of calculating the unweighted conditional probability are also contemplated. This calculation is repeated for each application provided by the cloud computing service to produce an unweighted scored list of applications.

Calculating the weighted conditional score for each application utilizes the global probability table 608 as well as the conditional probability table 610. Each individual conditional probability is weighted by the global probability of the given application. Thus more popular applications are given greater weight when calculating the score. For example, table 400 in FIG. 4 is the global probability table for the cloud computing service, table 500 in FIG. 5 is the conditional probability table for the cloud computing service, and the user has installed App B, App C, and App D. The scorer unit calculates the weighted conditional score for App A given App B, App C, and App D. The formula for the weighted conditional score may be expressed as $p(A|B, C, D) = (p(A|B)p(B) + p(A|C)p(C) + p(A|D)p(D))/(p(B) + p(C) + p(D))$. The values for the individual conditional probabilities $p(A|B)$, $p(A|C)$, and $p(A|D)$ are obtained directly from the conditional probability table. In table 500 in FIG. 5, the values are 1, 0, and 0.5 respectively. The values for the individual global installation probabilities $p(B)$, $p(C)$, and $p(D)$ are obtained directly from the global probability table. In table 400 in FIG. 4, the values are 0.5, 0.25, and 0.5 respectively. This gives a weighted conditional score for App A of 0.6. In general, given a set $(U_1, U_2, \ldots U_N)$ of user-installed applications, the total weighted conditional probability for an application may be calculated as $p(A|U_1, U_2, \ldots U_N) = (p(A|U_1)p(U_1) + p(A|U_2)p(U_2) + \ldots + p(A|U_N)p(U_N))/(p(U_1) + p(U_2) + \ldots + p(U_N))$. However, other ways of calculating the weighted conditional probability are also contemplated. This calculation is repeated for each application provided by the cloud computing service to produce a weighted scored list of applications.

The scored list of applications is the output of the scorer unit, shown at 612. The scored list of applications may be sorted by score, by application ID, or by any other sorting basis, or may be unsorted. The cloud computing service may use the outputted list to generate application recommendations for the user, or may combine the output of the scorer unit with other scoring methodologies to generate a composite scored list, which is then used to generate application recommendations for the user.

Figure 7:
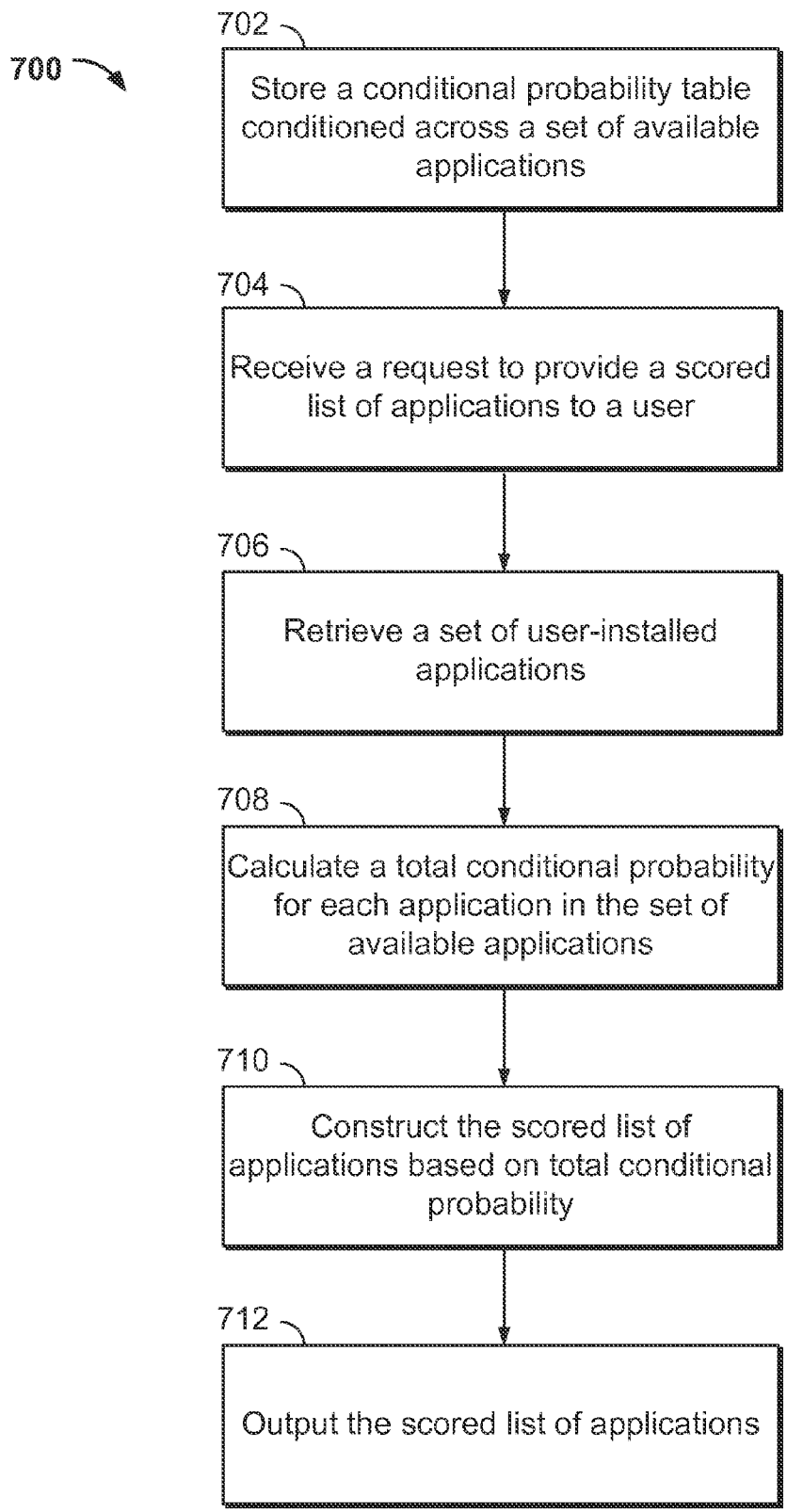
FIG. 7 shows a method for providing conditional installation-based recommendations for applications to a user in accordance with an implementation as described herein.

Methods for providing installation-based recommendations for applications to a user are now described, using conditional and/or global installation probabilities. Method 700 illustrated in FIG. 7 shows a method for constructing a scored list of applications based on conditional installation probabilities. Method 700 includes storing on a cloud computing service a conditional probability table across a set of available applications provided by the cloud computing service, where a first conditional probability in the conditional probability table is the probability that users of the cloud computing service who have installed a first application in the set of available applications have also installed a second application in the set of available applications. The method further includes receiving at the cloud computing service a request to provide a scored list of applications for a user, retrieving a set of user-installed applications for the user, and calculating a total conditional probability for each application in the set of available applications, where the total conditional probability of an application in the set of available applications is a function of the conditional probabilities of the application obtained from the conditional probability table given each application in the set of user-installed applications. The method further includes constructing the scored list of applications from the set of available applications, where a score of each application is its corresponding total conditional probability, and outputting the scored list of applications. Method 700 may be performed on one or more servers that provide a cloud computing service, such as cloud computing service 102 in FIG. 1 or cloud computing service 202 in FIG. 2. Specifically, a scorer unit within the cloud computing service, such as shown in FIG. 6, may perform all or a portion of method 700.

Method 700 begins when the cloud computing service creates and stores a conditional probability table, shown at 702. The conditional probability table records the probability that users of the cloud computing service will install one application provided by the cloud computing service given that the users have already installed another application provided by the cloud computing service. The rows and columns of the conditional probability table each represent the set of available applications provided by the cloud computing service to users. A particular entry in the conditional probability table is the conditional probability that the row application will be installed given the already-installed column application (or the table may be arranged vice versa). The cloud computing service may store a raw application installation table that records which applications each user of the cloud computing service have currently installed. The rows represent users and the columns represent applications (or vice versa). The conditional probability table is constructed from the data in the raw application installation table. For example, the conditional probability of each application given a specific application may be determined by isolating the rows of the raw application installation table for which users have installed the given application and determining the installation probabilities of the other applications. The raw application installation table and the conditional probability table may be updated periodically to include recent user activity such as installing or un-installing applications.

After the conditional probability table is created and stored, the cloud computing service receives a request to provide a scored list of applications to a user, shown at 704. The scored list of applications may be used to generate a set of recommended applications to show the user. The request may be triggered by certain user actions on the user interface provided by the cloud computing service. For example, the request may be triggered when the user logs into the cloud computing service on the user's client computer, or when the user navigates to an application selection or application browsing page on the user interface, or when the user navigates to a file preview screen. The request may include an instruction to use a conditional scoring method, or the default scoring method may be set to conditional scoring. The cloud computing service then retrieves a set of user-installed applications, shown at 706. The set of user-installed applications is the set of applications that the user requesting the list has currently installed. This set may be obtained from looking up the raw application installation table for that particular user.

After the set of user-installed applications have been retrieved, the cloud computing service calculates the total conditional probability of each application in the set of available applications provided by the cloud computing service, shown at 708. The total conditional probability of an application is a function of the conditional probabilities of the application obtained from the conditional probability table given each application in the set of user-installed applications. The total conditional probability may be weighted or unweighted. The request to provide a scored list of applications may include an instruction that determines whether the total conditional probability should be weighted or unweighted. An example of a general formula for calculating the unweighted total conditional probability of an application A is $p(A|U_1, U_2, \ldots U_N) = (p(A|U_1) + p(A|U_2) + \ldots + p(A|U_N))/N$ is the total conditional probability, N is the number of applications in the set of user-installed applications, and $p(A|U_n)$ is the conditional probability of the application given the n-th application in the set of user-installed applications. The values of $p(A|U_n)$ for each application in the set of user-installed applications is obtained from the conditional probability table. The application IDs of the target application and the set of user-installed applications may be used to find each conditional probability in the conditional probability table.

If the weighted total conditional probability is calculated, the cloud computing service uses a global probability table in addition to the conditional probability table. The global probability table records the probability that all users of the cloud computing service will install each available application provided by the cloud computing service. The raw application installation table is used to generate the values in the global probability table. The global probability table is stored by the cloud computing service and may be periodically updated. The global probabilities of each application in the set of user-installed applications are used as weights for the conditional probabilities given the application. An example of a general formula for calculating the weighted total conditional probability of an application A is $p(A|U_1, U_2, \ldots U_N) = (p(A|U_1)p(U_1) + p(A|U_2)p(U_2) + \ldots + p(A|U_N)p(U_N))/(p(U_1) + p(U_2) + \ldots + p(U_N))$ is the total conditional probability, N is the number of applications in the set of user-installed applications, $p(U_n)$ is the global probability of the n-th application in the set of user-installed application, and $p(A|U_n)$ is the conditional probability of the application given the n-th application in the set of user-installed applications. The application IDs of the target application and the set of user-installed applications may be used to find each conditional probability in the conditional probability table and each global probability in the global probability table.

After the weighted or unweighted total conditional probabilities have been calculated for each application in the set of available applications, a scored list of applications is constructed, shown at 710. The score for each application is the total conditional probability for that application. For example, the list may include the application ID and corresponding total conditional probability for each application in the set of available applications. The scored list may be unsorted, or may be sorted by score, application ID, or some other sorting basis. The scored list of applications is then outputted, shown at 712. The outputted list, either alone or combined with other scoring methods, may be used by the cloud computing service to recommend one or more applications to the user. In this manner, a cloud computing service provides a conditional scored list of applications for use in recommending applications to a user.

Figure 8:
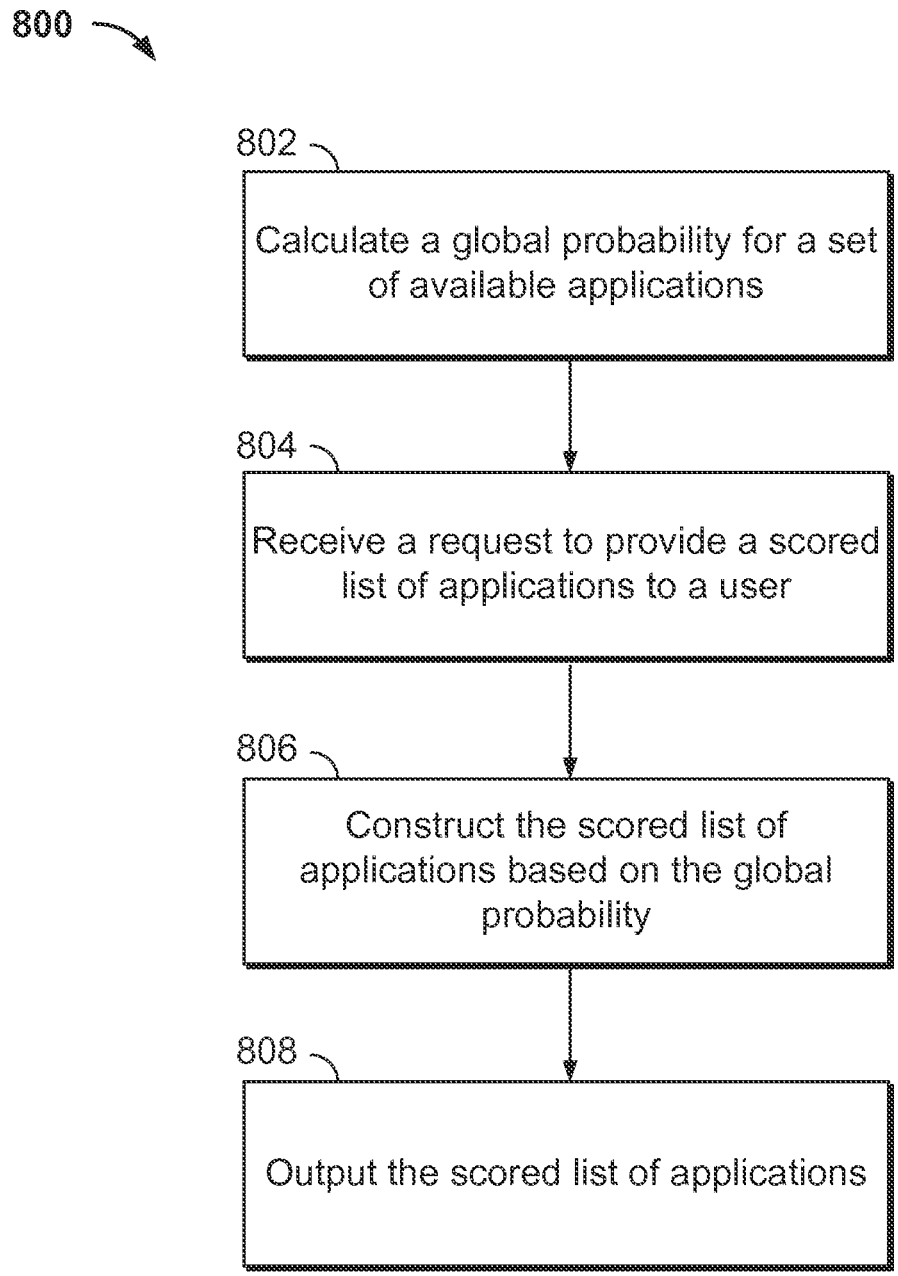
FIG. 8 shows a method for providing global installation-based recommendations for applications to a user in accordance with an implementation as described herein.

In some cases, instead of constructing a conditional scored list the cloud computing service may construct a global scored list based on the universal popularity of each application provided by the cloud computing service. Method 800 illustrated in FIG. 8 shows a method for constructing a scored list of applications based on global installation probabilities. Method 800 includes calculating, for each application in a set of available applications provided by a cloud computing service, a global probability that the application is currently installed across all users of the cloud computing service. The method further includes receiving at the cloud computing service a request to provide a scored list of applications for a user, constructing the scored list of applications from the set of available applications, where a score of each application in the scored list of applications is its corresponding global probability, and outputting the scored list of applications. Method 800 may be performed on one or more servers that provide a cloud computing service, such as cloud computing service 102 in FIG. 1 or cloud computing service 202 in FIG. 2. Specifically, a scorer unit within the cloud computing service, such as shown in FIG. 6, may perform all or a portion of method 800.

Method 800 begins when the cloud computing service calculates a global probability for each application in a set of available applications provided by the cloud computing service, shown at 802. The global probability of an application is the percentage of users of the cloud computing service that have currently installed the application. The cloud computing service may store a global probability table to record the global probability of each application. The cloud computing service may also store a raw application installation table that records which applications each user of the cloud computing service have currently installed. The rows represent users and the columns represent applications (or vice versa), and user IDs and application IDs may be used as row and column identifiers. The global probability table is constructed from the data in the raw application installation table. For example, the global probability of an application may be calculated by counting the number of users in the raw application installation table who have currently installed the application and dividing it by the total number of users. The raw application installation table and the global probability table may be updated periodically to include recent user activity such as installing or un-installing applications.

After the global probabilities of each application are calculated, the cloud computing service receives a request to provide a scored list of applications to a user, shown at 804. The scored list of applications may be used to generate a set of recommended applications to show the user. The request may be triggered by certain user actions on the user interface provided by the cloud computing service. For example, the request may be triggered when the user logs into the cloud computing service on the user's client computer, or when the user navigates to an application selection or application browsing page on the user interface, or when the user navigates to a file preview screen. The request may include an instruction to use a global scoring method, or the default scoring method may be set to global scoring.

After the request has been received, the cloud computing service constructs a scored list of applications, shown at 806. The score for each application is a function of the global probability for that application, and may equal the global probability or be a multiple of the global probability. For example, the list may include the application ID and corresponding global probability for each application in the set of available applications. The scored list may be unsorted, or may be sorted by score, application ID, or some other sorting. The scored list of applications is then outputted, shown at 808. The outputted list, either alone or combined with other scoring methods, may be used by the cloud computing service to recommend one or more applications to the user. In this manner, a cloud computing service provides a global scored list of applications for use in recommending applications to a user.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for providing a conditional scored list of applications for use in recommending applications to a user, the method comprising:

storing on a cloud computing service a conditional probability table across a set of available applications provided by the cloud computing service, wherein a first conditional probability in the conditional probability table is the probability that users of the cloud computing service who have installed a first application in the set of available applications have also installed a second application in the set of available applications;

receiving at the cloud computing service a request to provide a scored list of applications for a user;

retrieving a set of user-installed applications for the user;

calculating a total conditional probability for each application in the set of available applications, wherein the total conditional probability of an application in the set of available applications is a function of the conditional probabilities of the application obtained from the conditional probability table given each application in the set of user-installed applications;

constructing the scored list of applications from the set of available applications, wherein a score of each application is its corresponding total conditional probability; and outputting the scored list of applications.

2. The method of claim 1, wherein the scored list of applications is sorted by the score of each application.

3. The method of claim 1, wherein each application in the scored list of applications is identified by an application ID.

4. The method of claim 1, wherein the cloud computing service periodically updates the conditional probability table.

5. The method of claim 1, wherein the conditional probability table is constructed from a raw application installation table stored on the cloud computing service, wherein the raw application installation table records the applications each user of the cloud computing service has currently installed.

6. The method of claim 1, wherein the total conditional probability of each application is:

$$p(A|U_1, U_2, \ldots U_N) = (p(A|U_1) + p(A|U_2) + \ldots + p(A|U_N))/N,$$

wherein A is the application, $p(A|U_1, U_2, \ldots U_N)$ is the total conditional probability, N is the number of applications in the set of user-installed applications, and $p(A|U_n)$ is the conditional probability of the application given the n-th application in the set of user-installed applications.

7. The method of claim 1, wherein the cloud computing service stores a global probability for each application in the set of available applications, and wherein the global probability is the percentage of users of the cloud computing service that have currently installed the application.

8. The method of claim 7, wherein the total conditional probability is weighted by the global probability of each application in the set of user-installed applications.

9. The method of claim 8, wherein the weighted total conditional probability of each application is:

$$p(A|U_1, U_2, \ldots U_N) = (p(A|U_1)p(U_1) + p(A|U_2)p(U_2) + \ldots + p(A|U_N)p(U_N)/(p(U_1) + p(U_2) + \ldots + p(U_N)),$$

wherein A is the application, $p(AU_1, U_2, \ldots U_N)$ is the total conditional probability, N is the number of applications in the set of user-installed applications, $p(U_n)$ is the global probability of the n-th application in the set of user-installed application, and $p(A|U_n)$ is the conditional probability of the application given the n-th application in the set of user-installed applications.

10. The method of claim 7, wherein the request to provide a scored list of applications includes an instruction to weight the total conditional probability.

11. The method of claim 1, wherein the request to provide a scored list of applications is triggered by an action of the user on a user interface provided to the user by the cloud computing service.

12. An apparatus for providing a scored list of applications for use in recommending applications to a user, the apparatus comprising:

a server configured to:
 communicate with the plurality of client computers;
 store a conditional probability table across a set of available applications provided by the server, wherein a first conditional probability in the conditional probability table is the probability that users of the server who have installed a first application in the set of available applications have also installed a second application in the set of available applications;
 receive a request to provide a conditional scored list of applications for a user;
 retrieve a set of user-installed applications for the user;
 calculate a total conditional probability for each application in the set of available applications, wherein the total conditional probability of an application in the set of available applications is a function of the conditional probabilities of the application obtained from the conditional probability table given each application in the set of user-installed applications;
 construct the conditional scored list of applications from the set of available applications, wherein a score of each application is its corresponding total conditional probability; and
 output the conditional scored list of application.

13. The apparatus of claim 12, wherein the server is further configured to sort the conditional scored list of applications by the score of each application.

14. The apparatus of claim 12, wherein the server is further configured to periodically update the conditional probability table.

15. The apparatus of claim 12, wherein the conditional probability table is constructed from a raw application installation table stored on the server, wherein the raw application installation table records the applications each user of the server has currently installed.

16. The apparatus of claim 12, wherein the total conditional probability of each application is:

$$p(A|U_1, U_2, \ldots U_N) = (p(A|U_1) + p(A|U_2) + \ldots + p(A|U_N))/N,$$

wherein A is the application, $p(A|U_1, U_2, \ldots U_N)$ is the total conditional probability, N is the number of applications in the set of user-installed applications, and $p(A|U_n)$ is the conditional probability of the application given the n-th application in the set of user-installed applications.

17. The apparatus of claim 12, wherein the server is further configured to store a global probability for each application in the set of available applications, and wherein the global probability is the percentage of users of the server that have currently installed the application.

18. The apparatus of claim 17, wherein the total conditional probability is weighted by the global probability of each application in the set of user-installed applications.

19. The apparatus of claim 18, wherein the weighted total conditional probability of each application is:

$$p(A|U_1, U_2, \ldots U_N) = (p(A|U_1)p(U_1) + p(A|U_2)p(U_2) + \ldots + p(A|U_N)p(U_N)/(p(U_1) + p(U_2) + \ldots + p(U_N)),$$

wherein A is the application, $p(AU_1, U_2, \ldots U_N)$ is the total conditional probability, N is the number of applications in the set of user-installed applications, $p(U_n)$ is the global probability of the n-th application in the set of user-installed application, and $p(A|U_n)$ is the conditional probability of the application given the n-th application in the set of user-installed applications.

20. The apparatus of claim 17, wherein the server is further configured to store a global probability table that records the global probability of each application in the set of available applications.

21. The apparatus of claim 20, wherein the global probability table is constructed from a raw application installation table stored on the server, wherein the raw application installation table records the applications each user of the server has currently installed.

22. The apparatus of claim 17, wherein the server is further configured to:
receive a request to provide a global scored list of applications for the user;
construct the global scored list of applications from the set of available applications, wherein a score of each application in the scored list of applications is its corresponding global probability; and
output the global scored list of applications.

23. The apparatus of claim 12, wherein the server is further configured to provide a user interface to the user.

24. The apparatus of claim 23, wherein the request to provide a scored list of applications is triggered by an action of the user on the user interface.

25. A system for providing a scored list of applications for use in recommending applications to a user, the system comprising:
a plurality of client computers; and
a server, wherein the server is configured to:
communicate with the plurality of client computers;
store a conditional probability table across a set of available applications provided by the server, wherein a first conditional probability in the conditional probability table is the probability that users of the server who have installed a first application in the set of available applications have also installed a second application in the set of available applications;
receive a request to provide a conditional scored list of applications for a user;
retrieve a set of user-installed applications for the user;
calculate a total conditional probability for each application in the set of available applications, wherein the total conditional probability of an application in the set of available applications is a function of the conditional probabilities of the application obtained from the conditional probability table given each application in the set of user-installed applications;
construct the conditional scored list of applications from the set of available applications, wherein a score of each application is its corresponding total conditional probability; and
output the conditional scored list of application.

26. The system of claim 25, wherein the server is further configured to:
receive a request to provide a global scored list of applications for the user;
construct the global scored list of applications from the set of available applications, wherein a score of each application in the scored list of applications is its corresponding global probability; and
output the global scored list of applications.

* * * * *